United States Patent [19]

Ekman

[11] 4,278,276
[45] Jul. 14, 1981

[54] DEVICE FOR A COUPLING UNIT HAVING CONNECTABLE AND DISCONNECTABLE PARTS

[75] Inventor: Kjell R. Ekman, Zug, Switzerland

[73] Assignee: Ekman Engineering AG, Switzerland

[21] Appl. No.: 922,266

[22] Filed: Jul. 6, 1978

Related U.S. Application Data

[63] Continuation-in-part of Ser. No. 740,520, Nov. 10, 1976, abandoned.

[30] Foreign Application Priority Data

Nov. 12, 1975 [SE] Sweden .............................. 7512669
Feb. 16, 1976 [SE] Sweden .............................. 7601674

[51] Int. Cl.³ ............................................ F16L 11/12
[52] U.S. Cl. .................................... 285/49; 285/321; 285/354; 285/388
[58] Field of Search ............... 285/305, 321, 314, 351, 285/DIG. 25, 354, 332.2, DIG. 7, 49, 386-389, 353, 231, 232; 403/326, 321, 155, 108, DIG. 6, 225-227; 151/30; 85/8.8; 248/634; 267/140.2, 141.2, 140.3, 141.3

[56] References Cited

U.S. PATENT DOCUMENTS

| | | | |
|---|---|---|---|
| 115,917 | 6/1871 | Wharton | 285/351 |
| 298,150 | 5/1884 | Zoller | 285/359 |
| 3,305,249 | 2/1967 | Zahuranec | 285/354 X |
| 3,314,646 | 4/1967 | Ferguson et al. | 285/305 X |
| 3,428,340 | 2/1969 | Pelton | 285/321 X |
| 3,534,988 | 10/1970 | Lindsey | 285/305 |
| 3,540,760 | 11/1970 | Miller et al. | 285/354 X |
| 3,584,902 | 6/1971 | Vyse | 285/305 |
| 3,922,011 | 11/1975 | Walters | 285/321 X |
| 3,990,730 | 11/1976 | Ekman | 285/351 X |
| 3,999,781 | 12/1976 | Todd | 285/354 |

FOREIGN PATENT DOCUMENTS

| | | | |
|---|---|---|---|
| 683367 | 3/1964 | Canada | 285/321 |
| 640583 | 5/1962 | Italy | 285/354 |
| 1277385 | 6/1972 | United Kingdom | 285/305 |
| 1303475 | 1/1973 | United Kingdom | 285/305 |

*Primary Examiner*—Dave W. Arola
*Attorney, Agent, or Firm*—Pollock, Vande Sande & Priddy

[57] ABSTRACT

In a coupling unit having first and second parts connectable and disconnectable with each other, the second part is provided with an outer ring-shaped groove which extends through the wall of the second part along the circumference. The first part has a corresponding recess or groove. The parts are connected by at least one locking ring. The locking ring is located in the groove of the second part and has at least one indentation which extends through the groove and interacts with the recess in the first part.

10 Claims, 14 Drawing Figures

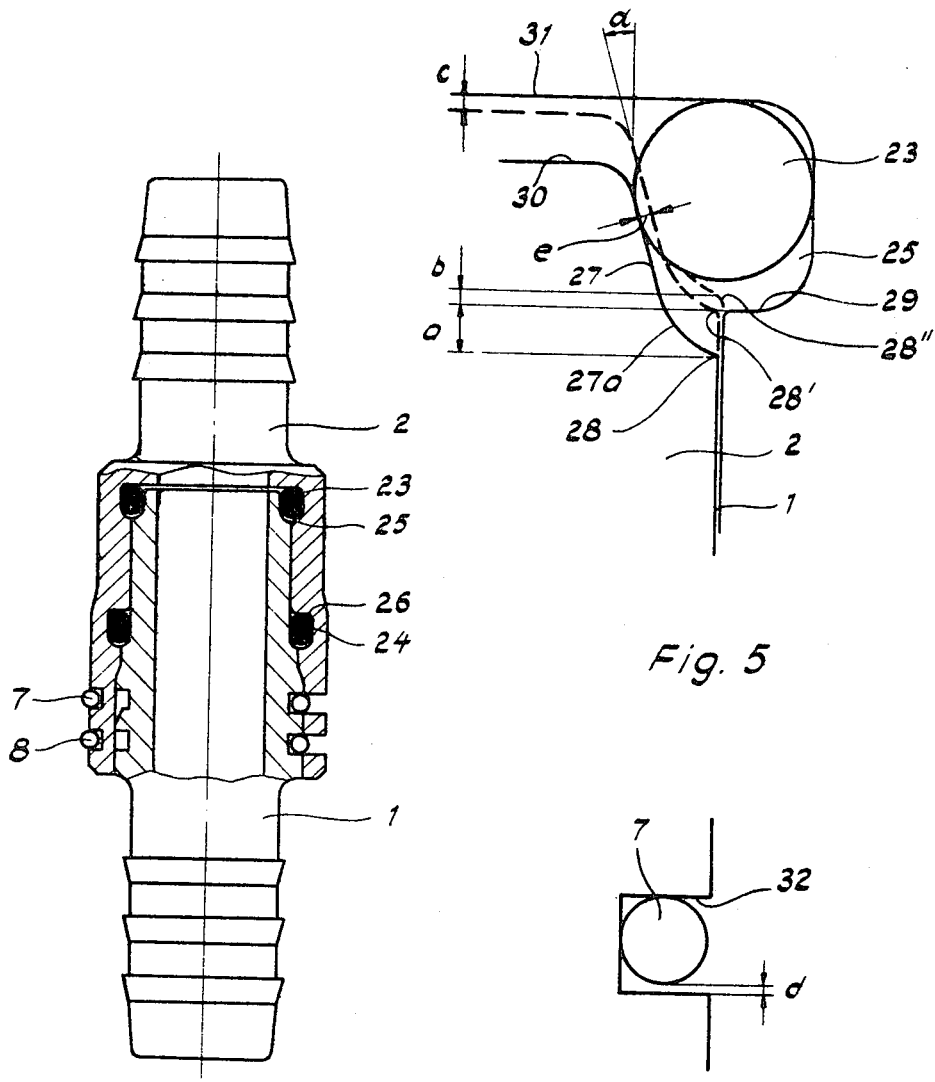

DEVICE FOR A COUPLING UNIT HAVING CONNECTABLE AND DISCONNECTABLE PARTS

The present application is a C.I.P. of application Ser. No. 740,520, filed Nov. 10, 1976 by the same inventor of the present invention, and now abandoned.

FIELD OF THE INVENTION

The present invention relates to a device for a coupling unit comprising a first part which is at least partially insertable into and removable out of a second part. After the first part is inserted into the second part, the parts are releasably locked together. The device comprises at least one member having a portion which extends through a groove in the second part and interacts with a recess or groove in the first part.

OBJECTS OF THE PRESENT INVENTION

Locking devices that connect telescoping tubular conduits are known in the art. Some examples are split cotters, locking pins or the like which connect the first and second parts via holes, slots, recesses, etc. However, the known devices which have been designed to meet the advanced safety regulations required by various regulatory boards tend to be comparatively difficult to attach and detach. There is also a need for different kinds of pipe joints, e.g. fuel pipes, and connections of the so-called "plug-in" type which can be temporarily connected, disconnected and cross connected for use with particular equipment.

The present invention is intended to overcome these problems and constitutes a device, which, in spite of its very simple structure and operation, provides a very safe locking connection which is capable of withstanding great mechanical loadings present in fuel pipes and structural members while reducing shock. The new device may be used when coupling fuel pipes, oil pipes, air pipes in cars, boats, vehicles and other similar types of structures.

The device of the present invention includes a coupling in which the first and second parts in the connected condition are sealed by means of two sealing rings spaced from each other in ring slots of their own on the second part. A first sealing ring is interactable with a sealing surface on an end of the first part, which sealing surface is countersunk in relation to the other envelope surface of the first part. The sealing surface extends to the envelope surface via a shoulder which together with the end wall of the ring recess of the first sealing rings forms a seat for the first sealing ring.

The present invention also relates to the interaction between the specific locking function and the position of the sealing rings used in the coupling unit. The interaction provides both vibrational safety and the ability to withstand high pressures of up to 180 MPa. It is further possible to minimize the forces necessary to connect the first and second parts during the whole connection procedure. Further embodiments disclose how to design the geometrical arrangement between the locking and sealing functions.

Still further embodiments disclose how to solve the problem of not exceeding the yield point in the material of the locking ring. This problem arises with coupling parts and locking rings of small diameters.

SUMMARY OF THE INVENTION

A characteristic feature of a preferred embodiment of the present invention is that the member having the form of an open and resilient locking ring extending about the second part and positioned within the groove is readily accessible from the outside of the second part, the locking ring being movable between a first angular position, in which the ring is disengaged from the first part, and a second angular position, in which the locking ring engages the first part.

A further embodiment of the present invention discloses a nut assembly enclosing an end of a first part with a resilient locking ring positioned within a slot formed by the nut and first part. A second part extends into the first part and is maintained in position by the locking ring contacting a groove formed in the second part.

BRIEF DESCRIPTION OF THE DRAWINGS

The invention is illustrated by way of example in the accompanying drawings and will below be more particularly described with reference thereto. In the drawings:

FIG. 4 is a vertical view of a partial cross-section of the coupling unit showing a plurality of sealing rings;

FIGS. 5 and 6 are vertical views of details in the coupling unit;

DESCRIPTION OF THE PREFERRED EMBODIMENT

Figure 1:
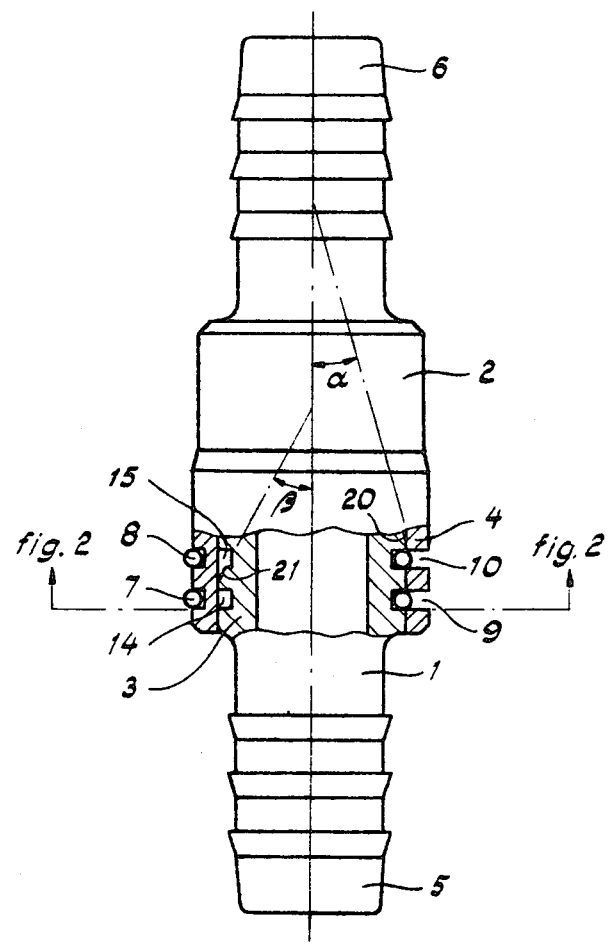
FIG. 1 is a vertical view showing a partial cross-section of a coupling unit.

In the unit of FIG. 1 a first part is designated 1 and a second part 2. Part 1 has a nipple 3 insertable into a case-formed part 4 of the part 2. The outer diameter of the nipple 3 corresponds with the inner diameter of the second part within a tolerance which allows parts 1 and 2 to be telescopingly positioned relative to each other.

The tolerance is chosen to obtain a pronounced mutual stiffness against bending of the parts 12 of the coupling unit. The case-formed portion of the part 2 is provided on its inner surface with seals (not shown) which prevent medium leaking into the tolerance gap between the connected parts 12. The seals can include one or more sealing rings known in the prior art.

The parts 1 and 2 include ends 5 and 6, respectively, which are connectable with tubes (not shown). For instance, flexible pipes can be forced over the grooves or ribs formed on the ends 5, 6.

Figure 2:
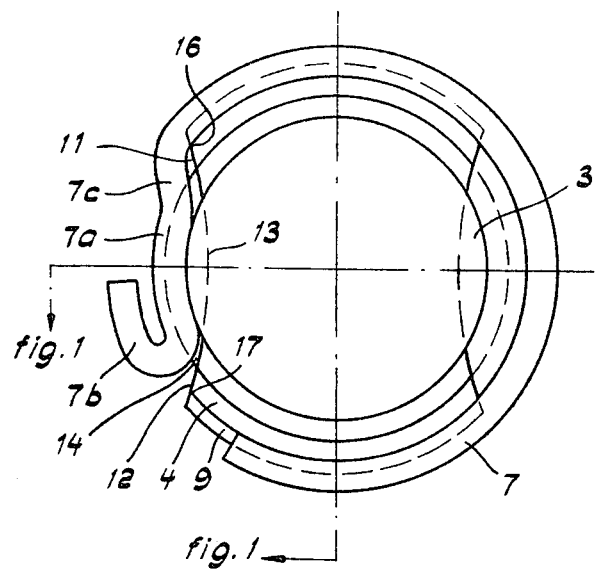
FIG. 2 is a cross-sectional view of the embodiment of FIG. 1 showing a first locking device.

The parts 12 can be telescoped into the locking position shown in FIG. 1 wherein the parts are lockable to each other by means of two axially spaced locking rings 7,8. A first locking ring is designated 7 while a second locking ring is designated 8. In the connected position, medium in the form of gas, fluid etc., is transferred through the parts 12 of the coupling unit and their attached pipes. For example, gasoline may be transferred through the coupling device. The locking rings 7, 8 of the preferred embodiment are identically designed and are formed as open rings as shown in FIG. 2. Each ring is constructed of spring material, such as stainless steel (Swedish standard SMS 2331) having a wire diameter of about 1.4 millimeter. Each ring can also be constructed of music wire, bronze alloy or similar material. Ring 7, 8 are positioned in peripheral outer slots 9 and 10, respectively formed in part 2. The inner diameter of each of the rings 7,8 is 10–15% less than the diameter of the respective slots 9, 10 which support the rings 7, 8. Therefore rings 7, 8 do not completely encircle slots 9, 10, respectively when positioned within the slots.

Each of the slots 9, 10 on the second part include oppositely directed grooves which extend completely through the tubular wall of the second part. In FIG. 2, the ends of the respective grooves from concave end surfaces 11 and 12. In order to better show the concave shape of both end surfaces 11, 12 in FIG. 2, the end surfaces 11, 12 are connected by the dotted line 13. Such a concave surface can be easily obtained through a well known cutting method. However, the end surfaces can take different forms such as a straight surface or even a convex surface which can be made by a so-called multi-edge lathing process on an automatic lathe.

The ring 7 shown in FIG. 2 is designed with an indentation 7a along a limited part of its circumference. The indentation 7a is connected to a protruding part 7b to form the particular ring end. At the intermediate part between the normal extension of the ring and the indentation, there is formed an intermediate part 7c. The extension of the intermediate part and the corresponding end surface 11 of the groove are substantially parallel. The other end 7b of the ring is partially turned.

Each ring is rotatable about its own axis, (which is also the common axis of the parts 1 and 2) between a first angular position in which the indentation 7a of the ring is removed from the groove extending completely through the tubular wall of the second part and rests on the bottom of the slots, and a second angular position shown in FIG. 2. In the second position, the indentation 7a of the ring extends completely through the groove and contacts a recess in the first part to lock parts 1 and 2 against both relative axial movement and relative rotation. Like the second part, the first part has both a peripherical first recess 14 and a peripherical second recess 15 extending around the circumference of the nipple 3. When in the second position, the indentation 7a is pressed inwardly and retained in the groove by the spring force of the ring 7, 8. The end surface 11 of the groove and the intermediate part 7c are substantially parallel to each other when the ring 7 is in the second angular position. This contributes in determining the second angular position of the ring 7. When moving from the second angular position according to FIG. 2 to the first angular position, the ring is turned clockwise 45°–90°. Interaction takes place between the intermediate part 7c and the end surface 11, in particular at the corner 16 of the end surface 11. This angular movement removes the indentation 7a from contact with the recess in part 1. The design of the U-shaped end part 7b facilitates the combined lifting and turning movement.

It would be, of course, within the scope of the invention to form the end 7b of the ring in any shape necessary for a specific application. For example, the end 7b may be formed to allow use of a tool, such as a screw driver, to rotate the ring 7 between the first and second positions. It it also possible to adapt at least a part of end part 7b transversally to the plane of FIG. 2 to form a more extended actuating surface which can be actuated manually by a thumb. The particular shape of the grooves and the indentation 7b of ring 7 allow only clockwise rotation of ring 7 from the second angular position to the first angular position. The ring 7 is not easy to turn in the counterclockwise direction from the second angular position due to the blunt front end of the ring 7 contacting the edges 12, 14 of the parts 1,2.

Each groove formed in part 2 has a length which is about 1/6 of the circumference of the second part. This means that the part 7a of the ring can be formed with a large extension in its longitudinal direction. The part 7a is also designed with a curved form which is adapted to the curved form of the current slot in the first part. This contributes to a greater degree of interaction of the slot of the first part with the side walls to provide a safe lock between parts 1 and 2.

Figure 3:
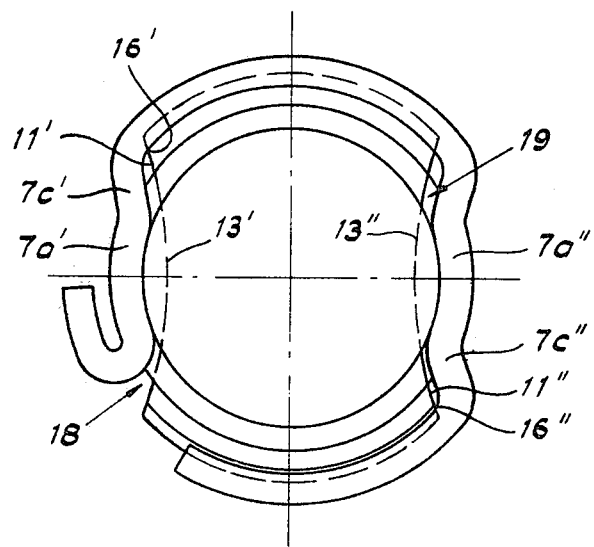
FIG. 3 is a cross-sectional view of a further embodiment of the unit showing a second locking device.

In the embodiment of FIGS. 1 and 2, the ring 7 has only one indentation 7a. However, it is possible to design the ring 7 with two or more indentations. As shown in FIG. 3, each indentation has its own groove 18 and 19, respectively. The embodiment of FIG. 3 discloses a ring having two oppositely positioned indentations 7a' and 7a''. Those parts of the ring and the groove 18 in FIG. 3 which correspond to the parts in FIG. 2 are given the same reference numerals with the addition of prime (') signs. The parts of the grooves 19 in FIG. 3 which functionally correspond with the ring and groove parts of the groove 18 have been given the same reference numerals with the addition of double-prime ('') signs. In order to move the ring 7 from its second position shown in FIG. 3 to the first angular position, the ring is rotated clockwise. In the embodiment according to FIG. 1 and 2 the second part has been provided with two opposite grooves even though the ring 7 has only one indentation. One of the grooves is not used in this case. This structural arrangement creates the possibility of substituting a ring with a plurality of indentations 7a for the single indentation shown in FIG. 2.

In the embodiment shown in FIGS. 1–3, both rings are identically formed. However, it can sometimes be advantageous to form one of the rings so that it has to be rotated clockwise from the *second to the first angular position* while the other ring is rotated counterclockwise from its *respective second position to its respective first position*. In such an arrangement it is possible to have locking on two diametrically opposite portions of the circumference of the parts 1, 2 even in the case where only single indentations are formed in the rings. This arrangement of using a plurality of rings, each with a single indentation on the same side, stabilizes the coupling against possible vibrations. The choice of one-side or double-side locking rings, releasing directions of the rings, etc. is determined for each specific coupling. In some cases it is better to use only one ring with either a single-side or double-side locking ring. It is also possible to provide the first and second parts with only that number of grooves which are needed for the locking function as such, i.e. if a ring with only one indentation is used the first and second parts need only be provided with a single slot and a groove of its own. The small tolerance between the nipple 3 and the case-formed part 4 of the second part creates a stiffness against bending between the first and second parts.

The procedure of the invention for locking the first and second parts is very simple. Each ring is moved to the second angular position before the connection procedure takes place. The nipple 3 is designed with a first conical surface 20 and a second conical surface 21. The first conical surface has a cone angle of about 15° in relation to the common axis of the parts 1 and 2, and the second conical surface has a cone angle of about 30° in relation to the same axis. The first conical surface is positioned in front of the slot 15 of the part 1 as seen from the free end of the same part. The second conical surface 21 is formed in the outer tubular wall of the first part between the slots 14 and 15. The wall thickness and the slot widths are designed to stiffen the first coupling part, which stiffened part has surfaces which are parallel to the axis. The stiffening is important for the structural strength of the connection and the locking function. The second conical surface is also formed with a wall which is transversal in relation to the center axis.

During the connection procedure of the parts, the first conical surface readily allows displacement of each indentation of both locking rings 7 and 8. The second conical surface readily allows displacement of only the particular indentation of the locking ring 7. After the displacements of the indentations, the spring force of the resilient locking rings forces the indentations into contact with the grooves of parts 1, and 2. The locking function is then completed.

The releasing of the locking rings is brought about by rotating the locking rings from the first to the second angular positions. The shape and position of the locking rings 7 and 8 allow for ease of rotation between the first and second angular positions. The slots 9, 10 of the second part axially hold the locking rings in relation to the second part. In a further embodiment lips (not shown) may replace the slots 9 and 10. The depth of the slots of parts 1 and 2, apart from the portion including the grooves in the second part, are designed to be 60-70% of the cross-section of each ring. The wall portion between the two slots in the first part and also between the two slots of the second part is designed to be 1-1.5 times the width of each slot.

The specific diameter of the ring, and the slot width, can vary with the particular use of the connection. The diameter may suitably fall within the range of 0.5-2.0 millimeters. The ring can be provided with a non-circular cross-section, for instance, oblong, square, etc. Each ring is also designed so it can be forced into the slot in second part. The diameter of the ring is designed to be up to 25% smaller than the diameter of the slot and preferably between 10-15% less than the diameter of the slot. The angles α and β are within the range 10°-20° and 20°-45°, respectively. The parts 1 and 2 are made of brass (Swedish standard SMS 5170) or a similar material. The pressure of the medium transferred through the coupling unit and connected pipes can vary between a vacuum and up to a positive pressure of at least 30 MPa. The material used in the parts 1 and 2 and the locking rings make it possible to load the parts with a separating force of nearly 200 kilograms when the parts having the sizes shown in FIG. 1, in which the parts are depicted in the scale 2:1 as compared to true size.

FIG. 4 shows the sealing rings 23 and 24 located between the first and second parts and spaced from each other in ring recesses 25 and 26, respectively, of the second part. The ring recesses 25, 26 are located in the inner wall of the second member and are interactable with the first member. The sealing rings are both O-shaped and made preferably in Nitril, but can also be made of other substances such as Vitron, etc. The ring recess 26 axially exceeds the diameter of sealing ring 24 (even when this one is compressed by the parts).

FIG. 5 shows in greater detail the shape and position in the ring recess 25 of the sealing ring 23, as well as the shape of that portion of the first part 1 which is designed with a sealing surface 27 countersunk in relation to the envelope surface of the first part. The sealing surface 27 interacts with the sealing ring 23 after the sealing surface 27 contacts the sealing ring during insertion of the first part into the second part. The sealing surface 27 is inclined and is connected to the envelope surface via an outstanding radius 27a and is connected to part 1 by a shoulder 28. Shoulder 28 is shown in three different positions in FIG. 5. In the position shown by the full lines, the sealing surface 27 has contacted the sealing ring 23. The shoulder 28' of the second part is level with the rear end wall 29 of the ring recess 25, and the locking rings 7, 8 can be positioned to lock the coupling parts 1, 2. When the shoulder 28 takes the position 28", it overlaps the rear end wall 29 and will be forced back to the position 28' by the expansion of sealing ring 23.

During the connection procedure of the parts 1 and 2, medium is present in front of the shoulder 28 because of remaining medium on the inner wall of the part 2 of medium leaking out from valves (not shown) in the parts 1 and 2. The valves can be positioned in devices connected to the parts 1,2. At the completion of the connection procedure, a medium cushion is trapped between the sealing ring 23 and the sealing ring 24 because of the sealing contact between the sealing surface 27 and the sealing ring 23. The non-compressible medium located within the coupling is forced into the gap between the surfaces of parts 1 and 2 and builds up in the recess 26 which axially exceeds the diameter of sealing ring 24.

In order to provide a fluid-tight seal that requires a small connecting pressure and results in the first part being suspended within the second part, it is important that the sealing ring 23 be partially compressed by the coupling parts 1, 2 and that the sealing ring 23 be further compressible to reduce vibrations and shocks which may damage the fluid-tight connection. In accordance with the invention, the degree of axial compression still present in sealing ring 23 must be between 2-20% and preferably 6-12% of the entire amount of compression present in sealing ring 23. The slanting angle of the sealing surface is 5°-45°, but can in certain cases also be 0°. The sealing ring 23 has a Shore number 70 and protrudes from the ring recess 25, at the end wall 29, with a length which substantially corresponds to its radius. In FIG. 5, distance "a" is the distance the shoulder 28 has to travel between the first contact between the sealing surface 27 and the sealing ring 23 and the position where the locking ring 7 locks coupling parts 1, 2. The distance "a" is chosen between 0.3-0.5 millimeters. A distance "b" indicates the overlap of the shoulder in relation to the end wall 29 of the ring recess 25. This distance "b" is approximately 0.1-0.2 millimeters. This distance "c" is the distance between the end surface 30 of the first part and an opposite surface 31 on the second part, and is the same as the distance "b". When the first part abuts surface 31, the operator knows there is contact between the surfaces. In the structure as shown, a seat bottom is formed by the end wall 29, the radius 27a and parts of the sealing surface 27, which seat bottom includes the gap formed by the tolerance between the parts 1 and 2, and is sealed by the sealing ring 23. As an example, the diameter of the first part can be 9.9 millimeters. The diameter at the bottom of the front ring recess is 14.6 millimeters, O-ring 23 has an inner diameter 9.92 millimeters and a section size of 2.62 millimeters causing a compression of about 10%.

FIG. 6 shows the position of the locking ring 7 in its slot to connect parts 1, 2 with the locking ring abutting the surface 32 of part 1. The distance "d" from the rear surface of the slot exceeds the distance "b" which is the space the shoulder 28 can overlap the end wall 29.

The locking rings 7 and 8 are positioned on the same side of both sealing rings 23, 24. The distance between the sealing rings 23, 24 is from 1 to 12.5, preferably 1.25 to 10 times the distance between sealing ring 24 and the locking ring 7. The positional relationship between the sealing rings and locking rings ensures a proper and readily accessible connection which is both fluid-tight and vibrationally-dampened.

Figure 7:
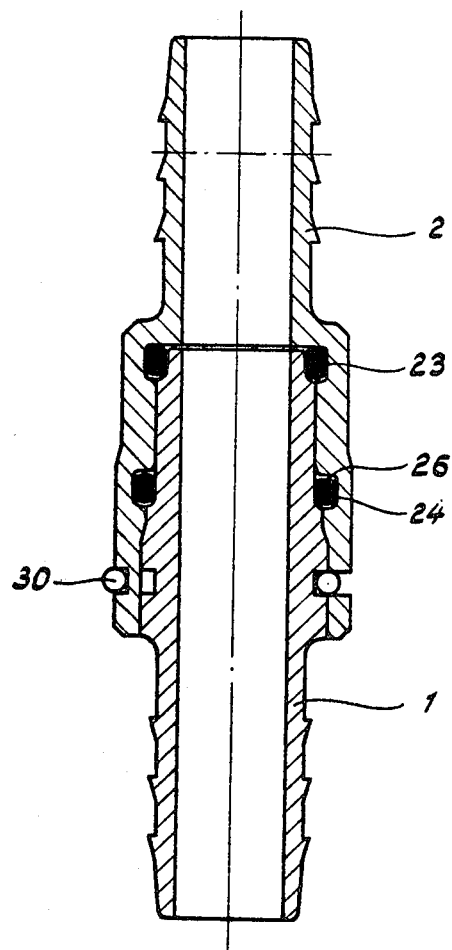
FIG. 7 is a vertical view of a cross-section showing a further embodiment of the coupling unit.

FIG. 7 illustrates a further embodiment of the coupling unit identical with the embodiment of FIG. 4 apart from its having only one locking ring 30 which is spaced from the sealing ring 23 substantially the same distance as the locking ring 7 in FIG. 4. The design of the locking ring 30 is similar to that which is shown in FIG. 2.

The locking ring embodiment of FIG. 2 is advantageous in those cases where the yield point in tension of the locking ring material is critical, for instance in cases using small ring and coupling parts with small diameters. In such a case, one of the ring ends is provided with both the indentation and the protruding part 7b adjacent to each other. The other ring end and the protruding part face each other via a well defined space when the locking ring is disposed in the second position. This allows the ring to be widely opened when attached to the second part without the fisk of exceeding the yield point in tension though the locking ring and coupling parts have comparatively small diameters. In spite of the limited extension of the indentation 7a, the locking ring is able to withstand the high loadings by the use of specific materials for the ring.

Figure 8:
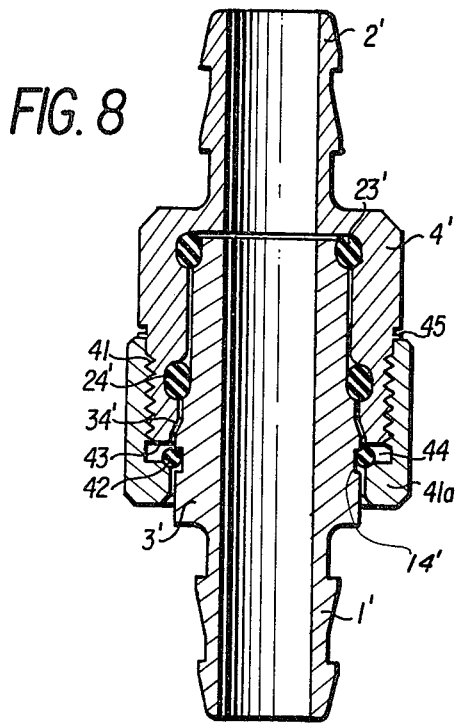
FIG. 8 is a cross-sectional view of an alternative embodiment of the present invention, wherein a nut is attached to an end of one of the coupling members.
Figure 9A:
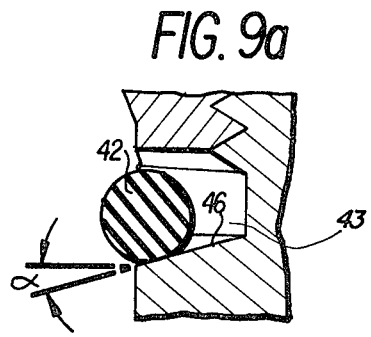
FIG. 9A shows a partial cross-sectional view of a slot for retaining a resilient locking ring according to the embodiment of FIG. 8.
Figure 9B:
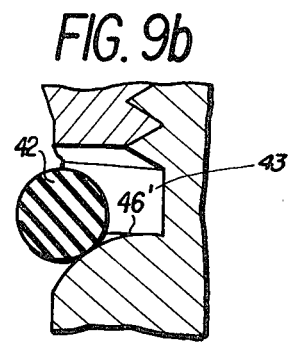
FIGS. 9B and 9C show partial cross-sectional views of modified slots as compared to FIG. 9A.
Figure 10A:
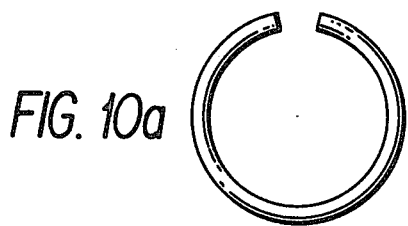
FIGS. 10A, 10B and 10C show alternative shapes for the locking ring of embodiments 1 and 8.
Figure 9C:
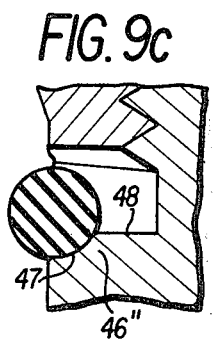
Figure 10B:
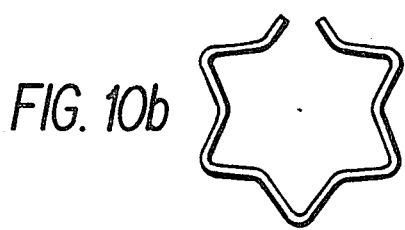
Figure 10C:
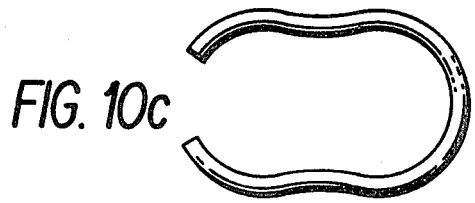

An alternative embodiment of the present invention will now be described with reference to FIGS. 8-10 of the attached drawings. Turning to FIG. 8, a first coupling part 1' includes a nipple 3' which is insertable into a case-hardened section 4' of a second coupling part 2'. The outer diameter of nipple 3' corresponds to the inner di(meter of the second coupling part to a tolerance allowing coupling parts 1' and 2' to be telescopingly positioned relative to one another. A pair of sealing rings 23' and 24' are positioned between coupling parts 1' and 2' in a manner similar to the previously discussed embodiments.

A nut assembly generally indicated at 40 is mounted on and fixedly attached to case hardened section 4' of coupling part 2' by threads formed on confronting surfaces of locking nut 40 and casing 4' as shown at 41. It would be within the scope of the present invention to attach nut 40 to case hardened section 4' of coupling part 2' by any conventional fastening assembly, such as a bayonet connection. Both nut 40 and nipple 1' may be formed of hardened steel, allowing the coupling to withstand pressures of up to 40 MPa pond per square centimeter. Furthermore, the locking nut 40 will not appreciably increase the overall diameter of the coupling.

Locking nut 40 includes an end portion 41a which overlaps locking nut 40 and coupling part 1' as shown in FIG. 8. An end wall of casing 4' is spaced from end portion 41a forming a slot 43 therebetween. A resilient locking ring 42 is positioned within slot 43 and extends into a corresponding recess 14' formed in coupling part 1'.

In order to properly position locking ring 42, slot 43 may include engagement means in the form of a wall 46 inclined at an angle to a horizontally extending plane and to an opposite side wall portion of slot 43, with $\alpha$ being selectively chosen between 0° and 45°. In an alternative embodiment, wall 46' may be curved away from the opposite wall of slot 43 and formed with a radius r as shown in FIG. 9B. In a further alternative embodiment, shown in FIG. 9C, wall 46" may be formed with curved portion 47 and a horizontally extending flat portion 48, allowing for easy positioning of locking ring 42.

Casing member 4' may conveniently be formed with a ridge 45 which prevents any accidental separation of nut 40 due to excessive vibrations. Alternatively, the ridge 45 on casing member 4' may be replaced with a cone-shaped surface, forcing the rear surface of the locking nut 40 to expand during engagement. The resulting frictional engagement between the locking nut 40 and casing member 4' counters vibrations which tend to loosen the connection over a period of time. In a like manner, slot 43 may vary in size dependent on the particular use of the present invention. Either the size of slot 43 or the size of resilient locking ring 42 can be varied in order to maintain a compressive force between the slot 43 and locking ring 42, which is necessary to resist vibrations arising during operation of the coupling. Finally, it is considered within the scope of the present invention to position a sealing ring adjacent to resilient locking ring 42 in order to ensure a fluid-tight connection between nut 40 and case 4'.

The invention is not restricted to the above-mentioned embodiments, but may be subjected to modifications within the scope of the following claims.

What I claim is:

1. A coupling device for transporting fluid from a source of fluid to an output conduit without fluid leakage even during extreme vibration of said coupling, and comprising:

a first tubular coupling member having a fluid passageway extending therethrough;

a second tubular coupling member having a fluid passageway extending therethrough;

said first and second tubular coupling members each having on a respective first end portion means for permitting contact-free insertion of said first tubular coupling part into said second tubular coupling part, thereby aligning said flow passageways extending therethrough;

a first circumferentially extending recess formed in an interior surface portion of said second tubular coupling member both radially and axially confronting a first circumferentially extending sealing surface countersunk adjacent an end surface of said first tubular coupling member and a second circumferentially extending recess formed in a further interior surface portion of said second tubular coupling member longitudinally spaced from said first recess and radially confronting a second circumferentially extending sealing surface countersunk in an exterior surface portion of said first tubular coupling member longitudinally spaced from said first countersunk sealing surface;

separate sealing ring means positioned in each pair of radially aligned recesses and countersunk sealing surfaces for suspensing said first tubular coupling member out of contact with said second tubular coupling member, to supress the transmission of vibrations therebetween, while limiting the insertion of said tubular coupling members into one another;

a hollow nut assembly surrounding a portion of said second tubular coupling member and including attachment means engaging complimentary attachment means formed on said second tubular coupling member for fixedly attaching said hollow nut assembly to said second tubular coupling part;

said hollow nut assembly including a portion overlapping and facing a substantially radially extending end wall of said second tubular coupling member to define a circumferentially extending slot therebetween;

said slot being spaced from said second circumferentially extending recess formed in said tubular coupling member a longitudinal distance less than the longitudinal distance between said first and second recesses to maintain proper journalling support between said first and second tubular coupling members irrespective of bending forces which affect the coupling device;

a resilient locking ring extending partially into said slot and confronting stop means formed on an exterior surface portion of said first tubular coupling member; and said hollow nut portion having wall means positioned for engaging and basing said resilient locking ring into tight frictional contact with said stop means, thereby biasing said first tubular coupling member into fluid-tight engagement with said separate sealing ring means, whereby one of said sealing ring means is compressed between said first recess and said first countersunk sealing surface to prevent further insertion of said first tubular coupling member into said second tubular coupling member.

2. A coupling device according to claim 1, wherein said stop means comprises a recess formed in an exterior surface portion of said first tubular coupling member, wherein said recess is substantially radially alignable with said slot upon insertion of said first tubular coupling member into said second tubular coupling member.

3. A coupling device according to claim 2, wherein a portion of said resilient locking ring assembly makes frictional contact with side wall surface of said recess formed in the exterior surface of said first tubular coupling member to prevent axial movement of first tubular coupling member relative to said second tubular coupling member.

4. A coupling device according to claim 1, wherein said wall means comprises a side wall portion of said slot formed by said hollow nut assembly being inclined away from an opposite side wall portion of said slot formed by the end wall of said second tubular coupling member.

5. A coupling device according to claim 1, wherein said wall means comprises a side wall portion of said slot formed by said hollow nut assembly being smoothly curved away from an opposite side wall portion of said slot formed by the end wall of said second tubular coupling member.

6. A coupling device according to claim 1, wherein said separate sealing ring means comprises a pair of resiliently deformable ring members, with at least one resiliently deformable ring member axially compressed between said first circumferentially extending recess and said first countersunk sealing surface respectively.

7. A coupling device according to claim 6, wherein said at least one resiliently deformable sealing ring is axially compressed to a reduced size 2-20 percent less its initial, uncompressed size upon contact with said recess and said radially aligned, countersunk sealing surface, with said at least one axially compressed sealing ring providing a fluid-tight seal between said first and second tubular coupling members, while limiting insertion of said first tubular coupling member into said second tubular coupling member.

8. A coupling device according to claim 6, wherein said countersunk sealing surface formed adjacent an end surface of said first tubular coupling member includes an inclined sealing wall portion extending from an end surface of said first tubular coupling member into contact with a curved sealing wall, said curved sealing wall joining a shoulder formed on the exterior surface of said first tubular coupling member, wherein said inclined sealing wall portion interacts with said resiliently deformable sealing ring for compressing said sealing ring into contact with said radially aligned recess upon insertion of said first tubular coupling member into said second tubular coupling member.

9. A coupling device according to claim 1, wherein said separate resiliently deformable sealing ring means radially separates said first and second tubular coupling members from one another, forming a gap for trapping a quantity of fluid therebetween during insertion of said first tubular coupling member into said second tubular coupling member, wherein said quantity of fluid further compresses said separate resiliently deformable sealing ring means to improve the sealing effect between said separate ring means and said pairs of recesses and radially aligned, countersunk sealing surfaces, respectively.

10. A coupling device according to claim 1, wherein hollow nut assembly attachment means comprises an interior surface portion of said hollow nut assembly including a plurality of threads substantially similar in configuration to a further plurality of theads comprising said complimentary attachment means, which further threads are formed on an outer surface portion of said second tubular coupling member to fixedly position and releasably attach said hollow nut assembly relative to said second tubular coupling member.

* * * * *